US005541776A

United States Patent [19]

Kobayashi et al.

[11] Patent Number: 5,541,776
[45] Date of Patent: Jul. 30, 1996

[54] FLUID TYPE OPTICAL DEVICE

[75] Inventors: Naoki Kobayashi, Tokyo; Shoichi Shimura, Kanagawa-ken; Takashi Kai, Tokyo, all of Japan

[73] Assignee: Canon Kabushiki Kaisha, Tokyo, Japan

[21] Appl. No.: 476,049

[22] Filed: Jun. 7, 1995

Related U.S. Application Data

[63] Continuation of Ser. No. 99,422, Jul. 30, 1993, abandoned.

[30] Foreign Application Priority Data

Aug. 28, 1992 [JP] Japan .................................. 4-230278

[51] Int. Cl.⁶ ........................... G02B 3/12; G02B 5/06
[52] U.S. Cl. ................................ 359/665; 359/832
[58] Field of Search ............................ 359/832, 665, 359/666, 667

[56] References Cited

U.S. PATENT DOCUMENTS 3,514,192  5/1970  De la Cierva ................... 359/832
4,614,405  9/1986  Brandenberg et al. ............. 359/832
5,166,831  11/1992  Hart ................................ 359/832

FOREIGN PATENT DOCUMENTS 4111906  6/1966  Japan .

*Primary Examiner*—Scott J. Sugarman
*Attorney, Agent, or Firm*—Fitzpatrick, Cella, Harper & Scinto

[57] ABSTRACT

An optical device comprises two optical elements, a deformable connecting member for joining the two optical elements to constitute a hermetic space, and a transparent substance enclosed in the hermetic space, and is arranged to be capable of varying an angle formed by the two optical elements. In such an optical device, a refractive index Ng of the optical elements and a refractive index Nt of the transparent substance are selected to satisfy the following inequality:

$$\left[ \frac{Ng - Nt}{Ng + Nt} \right]^2 < 0.005$$

3 Claims, 12 Drawing Sheets

1

FLUID TYPE OPTICAL DEVICE

This application is a continuation, of application Ser. No. 08/099,422, filed Jul. 30, 1993, now abandoned.

BACKGROUND OF THE INVENTION

1. Field of the Invention

The present invention relates to an optical device in which an optically transparent substance is hermetically enclosed in the space between two flat plates which are transparent to an employed range of wavelengths, and which is capable of transmitting a light flux without substantially impairing the optical performance of the light flux, by varying the relative angle between the two flat plates, i.e., an apex angle. More particularly, the present invention relates to an arrangement for restraining undesired light from occurring in an optical device having a structure for refracting a light flux at a desired angle, for example, an image stabilizing optical system which is disposed in a particular portion of the photographic system of a photographic camera, a video camera or the like to correct an image shake occurring due to a vibration of the photographic system.

2. Description of the Related Art

Conventionally, various kinds of optical devices capable of arbitrarily varying the optical performance of a transmitted light flux have been proposed. Such an optical device includes two transparent flat plates and an optically transparent substance, such as a liquid or a silicone rubber, which is hermetically enclosed in the space between the two transparent flat plates to form a variable angle prism, and is arranged to vary the angle between the two flat plates (i.e., the degree of parallelism) by an external urging force, thereby realizing the aforesaid capability to arbitrarily vary the optical performance of a transmitted light flux.

FIGS. 24 and 25 are schematic, cross-sectional views of an optical device which is proposed in, for example, Japanese Patent Publication No. Sho 41-11906. The optical device shown in FIGS. 24 and 25 includes two transparent flat plates 1 disposed in opposed relation to each other, a flexible, tubular connecting member 2 which circumferentially holds the two transparent flat plates 1, and a transparent liquid 3 which is hermetically enclosed in the space defined between the two transparent flat plates 1 by the flexible, tubular connecting member 2. In the optical device having the above-described arrangement, an incident light flux h is deflected by a predetermined angle, and the thus-deflected light flux is made to exit from the optical device. The optical device constitutes a variable angle prism capable of arbitrarily controlling its apex angle by varying the relative angle between the two flat plates 1 by an external urging force as shown in FIG. 25, thereby deflecting the incident light flux h by the predetermined angle and causing the thus-deflected light flux to exit from the optical device.

However, the conventional optical device has the problem that a ghost occasionally occurs and degrades image quality. The analysis performed by the inventors of the present invention makes it clear that the ghost is caused by a reflection occurring at the interface between either of the flat plates 1 and the transparent substance 3 hermetically enclosed in the optical device.

The inventors have discovered further problems involved in the conventional optical device.

One problem is that if an optical device having the aforesaid conventional arrangement using colored flat plates is adopted in an apparatus for forming an image by white light, correct color reproduction is difficult to achieve.

Another problem is that the quantity of light is somewhat smaller after the transmission of the light through the optical device than before the transmission.

SUMMARY OF THE INVENTION

It is, therefore, an object of the present invention to provide an optical device capable of solving the above-described problem and achieving optically high performance.

Another object of the present invention is to provide an optical device capable of solving the problem that the use of colored flat plates makes it difficult to achieve correct color reproduction in the case of an apparatus for forming an image by white light, A further object of the present invention is to provide an optical device capable of solving the problem that the quantity of light is somewhat smaller after the transmission of the light through the optical device than before the transmission.

To achieve the above objects, in accordance with one aspect of the present invention, there is provided an optical device which includes two flat plates, a deformable connecting member which is bonded to the two flat plates by an adhesive in such a manner as to form a hermetic space in combination with the two flat plates, or a deformable assembly of such a connecting member and a supporting member, and a transparent substance which is enclosed in the hermetic space. The refractive index of the two flat plates and that of the transparent substance satisfy the following expression:

$$0 \leq \left[ \frac{Ng - Nt}{Ng + Nt} \right]^2 < 0.005$$

Ng: refractive index of the flat plates
Nt: refractive index of the transparent substance As a material for the flat plates, it is preferable to employ any one of a soda glass (Nd=1.512), an optical glass which will be described later, and a silica glass (Nd=1.459). As the optical glass, it is preferable to employ a glass composed of one or more kinds of materials selected from among compounds such as $SiO_2$, $B_2O_3$, $Al_2O_3$, $Na_2O$, CaO, ZnO, BaO, PbO, $Sb_2O_3$, $As_2O_3$, $KHF_2$, $TiO_2$, $P_2O_5$, $Li_2O$, SrO, MgO, $Ta_2O_5$, $ZrO_2$ and $La_2O_3$. Typical examples of the glass are a fluor crown glass (Nd=1.45–1.48), a dense fluor crown glass (Nd=1.45–1.49), a phosphate crown glass (Nd=1.48–1.54), a special phosphate crown glass (Nd=1.48–1.54), a dense phosphate crown glass, a borosilicate crown glass (Nd=1.48–1.54), light barium crown glass (Nd=1.45–1.54), a crown glass (Nd=1.45–1.54), a zinc crown glass (Nd=1.45–1.54), a barium crown glass (Nd=1.54–1.60), a dense barium crown glass (Nd=1.54–1.65), an extra dense barium crown glass (Nd=1.60–1.67), a light lanthanum crown glass (Nd=1.63–1.70), a lanthanum crown glass (Nd=1.62–1.73), a tantalum crown glass (Nd=1.72–1.80), a crown flint glass (Nd=1.45–1.55), an antimony flint glass (Nd=1.45–1.56), a light barium flint glass (Nd=1.54–1.60), an extra light flint glass (Nd=1.45–1.57), a barium flint glass (Nd=1.55–1.71), a light flint glass (Nd=1.45–1.60), a dense barium flint glass (Nd=1.58–1.74), a dense flint glass (Nd=1.45–2.00), an extra dense flint glass (Nd=1.70–1.85), a fluor flint glass (Nd=1.45–1.60), a light lanthanum flint glass (Nd=1.67–1.74), a lanthanum flint glass (Nd=1.67–1.74), a lanthanum flint glass (Nd=1.67–1.75), a niobium flint glass (Nd=1.73–1.78), a tantalum flint glass (Nd=1.75–2.00), a dense niobium flint glass (Nd=1.75–1.85), a dense tantalum flint glass (Nd=1.80–2.00), an extraordinary dispersion crown glass (Nd=1.58–1.64), an extraordinary dispersion flint glass (Nd=1.56–1.70), an athermal crown glass (Nd=1.60–1.65), and an athermal flint glass (Nd=1.60–1.70). As another material for the flat plates, it is also preferable to employ a plastics material which is transparent in a visible light range, such as an acrylic (PMMA) resin (Nd=1.492), a polycarbonate (PC) resin (Nd=1.583), a polystyrene (PS) resin (Nd=1.592) or a modified olefin resin (Nd=1.525).

In addition, to improve light transmittance in a specific range of wavelengths or a specific visible light range, it is also preferable to perform a transparency-increasing process by forming a single- or multiple-layer anti-reflection film, which is generally called "magenta. cyan.purple", on the air-side surface of each of the flat plates.

As a material for such anti-reflection film, it is preferable to employ an inorganic material of low refractive index such as $MgF_2$ or $SiO_2$ or an organic material such as a fluoropolymer. The anti-reflection film may be formed on the flat plates under reduced pressure by a process such as evaporation coating, sputtering or chemical vapor deposition, or by a wet process such as a sol-gel process, a spin coating process or a dipping process. Otherwise, a material whose refractive index is not low may be prepared, and minute holes which do not adversely affect image quality may be formed in the material so that its apparent refractive index is lowered.

The two flat plates 1 each having the above-described arrangement are prepared and bonded to connecting members 22 or supporting members 21 (refer to FIGS. 1 and 2) by a rubber- or resin-based adhesive, and a transparent substance 3 is hermetically enclosed in the space surrounded by the flat plates 1 and the connecting members 22 (or an assembly of the connecting members 22 and the supporting members 21), thus preparing an optical member.

Each of the connecting members 22 is at least partially deformable so that the angle formed by the pair of flat plates 1 can be varied by an external urging force as shown in FIG. 3. Each of the connecting members 22 may be deformable partially or entirely, and a conventionally known art using a flexible cylindrical member or a flexible bellows structure can be applied to form the deformable portions of the connecting members 22.

The optical device may be deformed by the application of an appropriate urging force to the external circumferential portion of the optical device by means of an actuator 30 such as a mechanism using a screw and a cam, a piezoelectric element, an electromagnet, an ultrasonic motor or a shape memory alloy having a function utilizing temperature variations.

DETAILED DESCRIPTION OF THE PREFERRED EMBODIMENTS

Figure 1:
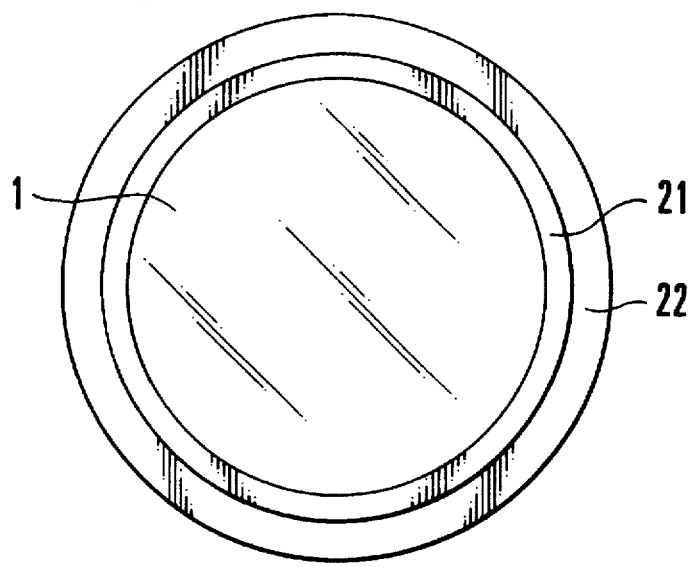
FIG. 1 is a schematic plan view of an optical device according to one embodiment of the present invention.
Figure 2:
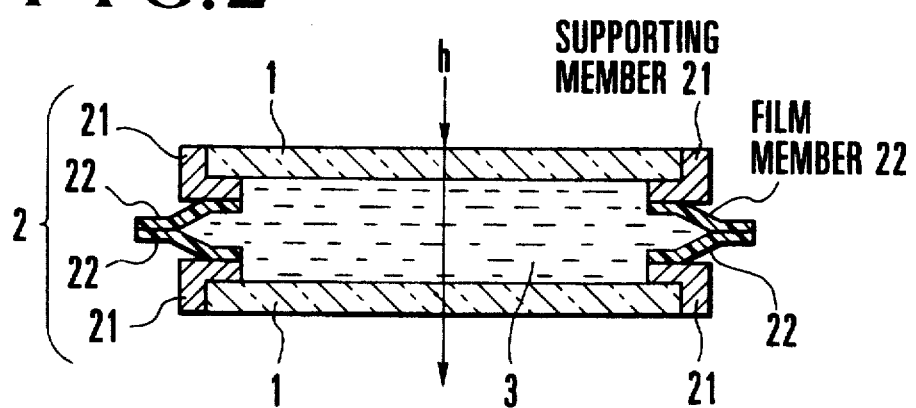
FIG. 2 is a schematic cross-sectional view of the optical device of FIG. 1.

FIGS. 1 and 2 are a schematic plan view and a cross-sectional side view, respectively, showing the arrangement of the essential portions of an optical device.

Two flat plates 1 are made from optically transparent plates such as glasses or plastics as described above. If there is no external urging force, the angle between the flat plates 1 is approximately zero degrees, i.e., the flat plates 1 are approximately parallel as shown in FIG. 2. Although in the shown arrangement each of the flat plates 1 has a disk-like shape, square-shaped plates may also be used as the flat plates 1. Although in the shown arrangement the flat plates 1 are disposed as parallel flat plates, they may also be disposed in the form of a convex-flat lens.

A connecting member 2 for connecting the flat plates 1 includes annular film members 22 each having softness and flexibility, made from a polymeric film or an aluminum foil, and annular supporting members 21 each having an L-shaped cross section. One of the annular supporting members 21 is provided between one of the flat plates 1 and the adjacent one of the film members 22, while the other annular supporting member 21 is provided between the other flat plate 1 and the film member 22 adjacent thereto.

Each of the supporting members 21 is made of a material of high hardness, such as plastics, and supports the adjoining flat plate 1 in such a manner as to surround the periphery thereof. To increase the rigidity of the supporting members 21, it is also preferable to employ a composite material insert-molded with a metallic material, such as aluminum or stainless steel, or a composite material made from resins, such as a glass-containing polyester, combined by two-color molding or adhesive-bonding.

The respective flat plates 1 and the adjoining supporting members 21 are hermetically bonded to each other, the respective supporting members 21 and the adjoining film members 22 are hermetically bonded to each other, as well as the two film members 22 are hermetically bonded to each other, thereby forming a hermetic space.

The transparent substance 3 to be enclosed in the hermetic space may be selected from, for example, the group consisting of water (Nd=1.333), alcohol (Nd=1.35–1.46), a silicone oil (Nd=1.39–1.54), a modified silicone oil (Nd=1.38–1.47), a silicone rubber (Nd=1.35–1.46), glycol (Nd=1.43), a silicone gel (Nd=1.35–1.46), an organic oil (Nd=1.43) and the like.

The refractive index of the flat plates 1 and the refractive index of the transparent substance 3 which is enclosed in the hermetic space are preferably selected to satisfy the following inequality:

$$0 \leq \left[ \frac{N_g - N_t}{N_g + N_t} \right]^2 < 0.005$$

This expression is intended to determine the upper limit of a reflectance at the interface between the flat plates 1 and the transparent substance 3. If the upper limit is exceeded, light reflected at the interface produces a ghost in a photographed video image and the ghost occasionally impairs the quality of the image.

Numerical examples according to the present invention and comparative examples which brought about impaired image quality will be described later for comparison purpose.

The operation of the optical device will be described below.

As shown in FIG. 2, if no urging force is applied to the optical device, the apex angle formed by the two flat plates 1 is approximately zero degrees, i.e., the outside surfaces of the respective flat plates 1 are kept approximately parallel to each other. During this state, the incident light flux h directly passes through the optical device and exits therefrom.

Figure 3:
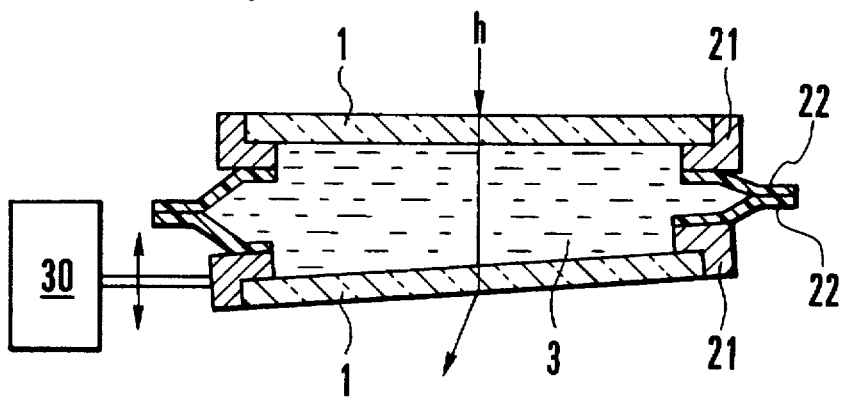
FIG. 3 is a schematic cross-sectional view of the optical device of FIG. 1.

If an urging force is applied to a portion of the external periphery of the optical device, the apex angle formed by the two flat plates 1 varies to have a predetermined magnitude, as shown in FIG. 3, and the optical device functions as a kind of variable angle prism. Accordingly, as shown in FIG. 3, the incident light flux h is refracted and exits from the optical device. During this time, since the cubic volume of the transparent substance 3 is invariable, the left-side portions of the film members 22 expand, while the right-side portions of the film members 22 shrink, as viewed in FIG. 3.

If the optical device is used in a front or intermediate portion of the photographic system of, for example, a photographic camera or a video camera, so far as the driving speed at which the urging force is produced is not excessively large, the urging force which deforms the transparent substance 3 is small to such an extent that the resistance of the transparent substance 3 made of a liquid or the like can be ignored. For this reason, in practice, a driving force for deforming the optical device (deforming driving force) is determined by the deforming stress of the connecting member 2.

By appropriately selecting the material and the shape of the connecting member 2, particularly the film members 22, it is possible to restrain the deforming driving force of the optical device to a minimum extent.

Figure 4:
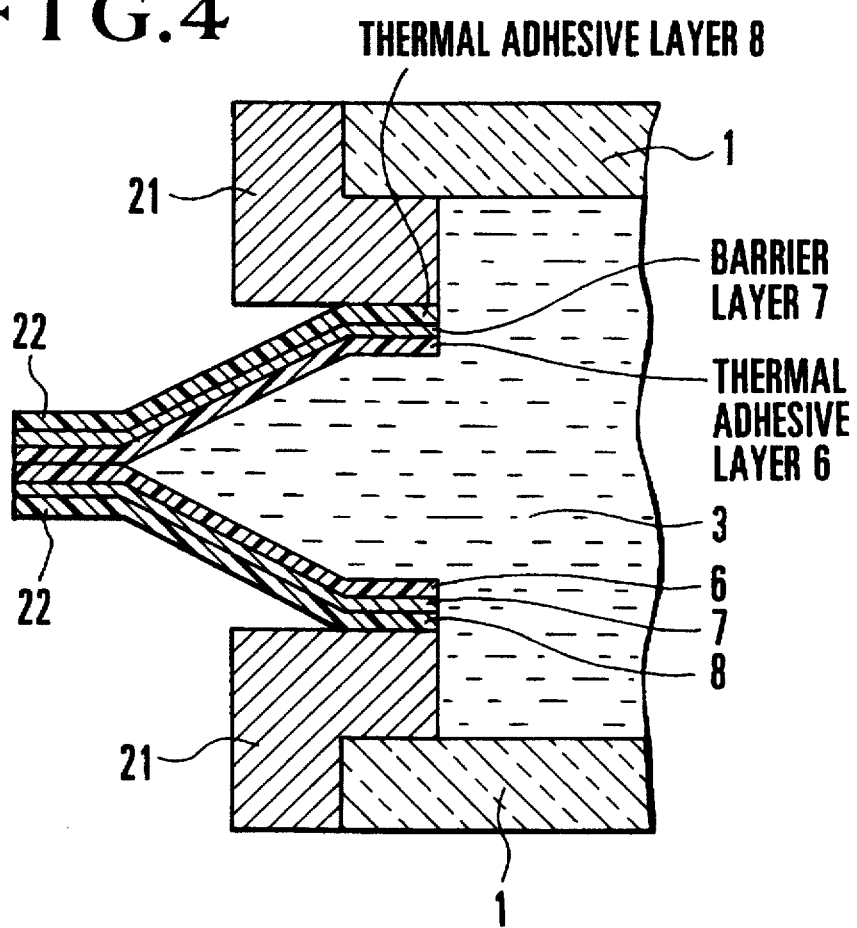
FIG. 4 is a schematic cross-sectional view of a portion of the optical device of FIG. 1.

Although each of the film members 22 may be of single-layer structure, a three-layer structure is adopted as shown in FIG. 4 in the present embodiment. A multiple-layer structure is preferable since a function such as strength can be added.

Each of the film members 22 includes a film thermal adhesive layer 6 which is used for thermally bonding (welding) the film members 22 to each other, a barrier layer 7 for protecting the transparent substance (liquid) 3 from external moisture and the like and holding the strength of the film member 22, and a supporting-member thermal adhesive layer 8 which is used for thermally bonding the polymeric film member 22 and the adjoining supporting member 21 to each other, and the film thermal adhesive layer 6, the barrier layer 7 and the supporting-member thermal adhesive layer 8 are thermally bonded together.

The supporting member 21 is a molded polyethylene article which is insert-molded with a frame made from an aluminum cut member or a formed high-strength resin so as to have the shape of extending around the external periphery of the flat plate 1.

The connecting member 2 is prepared in such a way that the internal circumferential portions of the respective film members 22 (the supporting-member thermal adhesive layers 8) are thermally bonded to the supporting members 21 and, then, the external circumferential portions of the respective film members 22 (the inward facing sides of the respective film thermal adhesive layers 6) are thermally bonded to each other. According to this construction, each deformable portion (film portion) of the connecting member 2 is bent at a small angle so that the deforming driving force for the optical device can be made small.

A material for the film thermal adhesive layer 6 is preferably selected from substances which do not melt or swell in the transparent material (liquid) 3 and which make it possible to easily thermally bond the external circumferential portions of the respective film members 22 to each other. The material may be selected from, for example, the group of consisting of low-density polyethylene, linear low-density polyethylene, high-density polyethylene, medium-density polyethylene, polypropylene, polyamide, polyester and the like. These materials are preferable since established thermal bonding processes are available. If the enclosed transparent substance 3 is of the kind which easily swells the film members 22, it is preferable to use a fluoropolymeric film having a strong solvent resistance, such as polytetrafluoroethylene, polytrifluoroethylene, polyvinylidene fluoride, polyvinyl fluoride, a tetrafluoroethylene-hexafluoropropylene copolymer, an ethylene-tetrafluoroethylene copolymer or a tetrafluoroethylene-perfluoroalkyl vinyl ether copolymer.

The thickness of the film thermal adhesive layer 6 is preferably approximately 5–100 μm, more preferably 20–60 μm. Thicknesses of less than 5 μm and greater than 100 μm are not preferable. In the case of the thicknesses of less than 5 μm, the film members 22 are somewhat deformed or thinned due to thermal melting during thermal bonding and it is, therefore, difficult to hold a desired bonding strength. In the case of the thicknesses of less than 100 μm, the rigidity of the film members 22 increases and the deforming driving force becomes large.

The barrier layer 7 performs the function of preventing moisture absorption and gas permeation from occurring in the transparent substance 3 and the function of holding the shape of the film member 22, and an aluminum foil may be used as a material for the barrier layer 7 because of its perfect gas barrier properties and its inexpensiveness. However, it is to noted that, during repetitive deformation, pinholes occur in the aluminum foil to impair the barrier properties thereof and also that if the thickness of the aluminum foil is 50 μm or more, its rigidity increases and the deforming driving force for the optical device needs to be increased. A film having good moisture barrier properties, such as a polyvinylidene chloride film or an aluminum-evaporated polymeric film, may also be employed. Otherwise, a film having a low gas permeability, such as a polyvinyl alcohol film or a polyethylene-polyvinyl alcohol copolymer film, may be employed. Further, to improve piercing strength and pinhole resistance, one layer such as a nylon film may be added between the barrier layer (or holding layer) 7 and the thermal adhesive layer 6 or 8

If the adhesiveness between the barrier layer 7 and the thermal adhesive layer 6 or 8 is not sufficient, it is preferable to add an intermediate layer such as a polyester layer between the barrier layer 7 and the thermal adhesive layer 6 or 8, since their bonding strength can be increased and it is possible to restrain occurrence of delamination due to swelling in the transparent substance 3, repetitive bending or the like.

It is preferable that a material for the supporting-member thermal adhesive layer 8 be of the same kind as a material for the supporting member 21, since the thermal bonding strength between the supporting-member thermal adhesive layer 8 and the supporting member 21 can be increased. Accordingly, the material for the supporting-member thermal adhesive layer 8 is determined by the required dimensional precision of the supporting member 21. The material may be selected from, for example, the group consisting of polyester, polyamide, polycarbonate, polypropylene, low-density polyethylene, linear low-density polyethylene, medium-density polyethylene, high-density polyethylene, polypropylene, polyvinyl chloride or the like. The thickness of the supporting-member thermal adhesive layer 8 may be approximately 5–100 μm, particularly 20–60 μm. The reason why these thicknesses are preferable is similar to that described in connection with the film thermal adhesive layer 6.

The film thermal adhesive layer 6 and the supporting-member thermal adhesive layer 8 are each preferably made from an unextended film manufactured by a casting process, an extrusion process or the like, or from an extended or unextended film manufactured by an inflation process.

The entire thickness of the three-layer structure of the film member 22 according to the present embodiment is preferably not greater than 200 μm, more preferably 10–100 μm for the purpose of reducing the required deforming driving force.

Regarding a manufacturing method for the film member 22, if the barrier layer 7 is made of a polymeric resin, the three layers may be manufactured at a time by an extrusion process.

Figure 5:
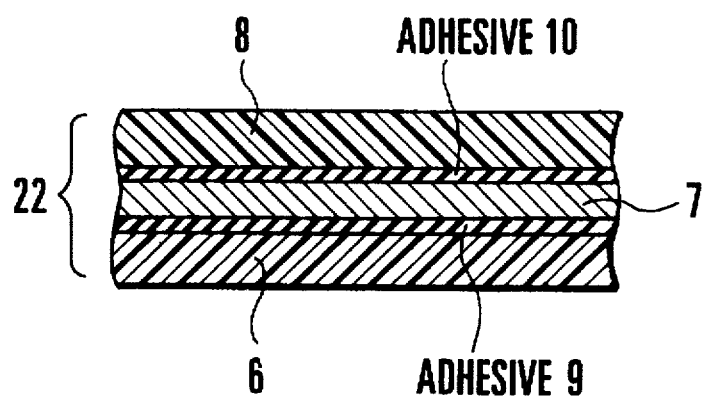
FIG. 5 is a fragmentary, schematic cross-sectional view of constituent elements of the optical device of FIG. 1.

If the barrier layer 7 is made from an aluminum foil or an extended plastics film, the film member 22 may also be manufactured by, for example, a dry lamination process using adhesives 9 and 10 as shown in FIG. 5 or an extrusion lamination process using molten polyethylene as the adhesives 9 and 10, in order to gain a high bonding strength. The film member 22 may also be formed by the inflation process of forming the layers 6, 7 and 8 as well as the layers 9 and 10 at a time.

The film member 22 may also be made from a general-purpose wrapping film having a construction such as polyester/Al/high-density polyethylene, polyester/nylon/low-density polyethylene, polyester/Al/polypropylene, polyamide/Al/high-density polyethylene, polyester/polyvinyl alcohol or polyethylene-polyvinyl alcohol copolymer/polypropylene, polyamide/Al/polypropylene, linear low-density polyethylene/polyester/Al/polyester/linear low-density polyethylene, evaporated Al linear low-density polyethylene/polyester/evaporated Al linear low-density polyethylene, evaporated Al linear low-density polyethylene/evaporated Al polyester/evaporated Al linear low-density polyethylene/evaporated Al linear low-density polyethylene/evaporated Al polyester/linear low-density polyethylene, linear low-density polyethylene/fluoro film/linear low-density polyethylene, linear low-density polyethylene/polyvinyl chloride/linear low-density polyethylene, linear low-density polyethylene/polyvinyl alcohol or polyethylene-polyvinyl alcohol copolymer/linear low-density polyethylene, linear low-density polyethylene/nylon/polyvinyl alcohol or polyethylene-polyvinyl alcohol copolymer/linear low-density polyethylene, or linear low-density polyethylene/nylon/linear low-density polyethylene.

Examples of the optical device according to the present embodiment were prepared under the following conditions, respectively.

(NUMERICAL EXAMPLE 1)

Adhesive: one-part de-acetic type room temperature curing fluorine-modified silicone adhesive Supporting member: polyethylene insert-molded with a glass-containing polycarbonate frame Film member: polyethylene/adhesive/black-printed layer/polyvinyl alcohol-polyethylene copolymer/aluminum-evaporated film/black-printed layer/adhesive layer/polyethylene Flat plate: blue flat glass (diameter: 43 mm, thickness: 1.2 mm, Nd=1.52) coated with $TiO_3ZrO_2$ 22.1 nm, $Al_2O_3$ 70.6 nm, $TiO_3ZrO_2$ 159.2 nm, $Al_2O_3$ 16.0 nm, $TiO_3ZrO_2$ 73.4 nm and $MgF_2$ 130.5 nm (nm: optical film thickness) by a vacuum evaporation process Internal liquid material: modified silicone oil (Nd=1.4205)

In the case of the numerical example 1, a ghost was 0.11% and no image quality was impaired.

The light transmittance of the entire optical device in a light-wavelength range of 400 nm to 700 nm was approximately 99.3% which was a value free of a practically substantial problem.

(NUMERICAL EXAMPLE 2)

Adhesive: one-part de-acetic type room temperature curing fluorine-modified silicone adhesive Supporting member: polyethylene insert-molded with a glass-containing polycarbonate-frame Film member: polyethylene/adhesive/black-printed layer/polyvinyl alcohol-polyethylene copolymer/aluminum-evaporated film/black-printed layer/adhesive layer/polyethylene Flat plate: BSC1 optical glass (diameter: 43 mm, thickness: 1.2 mm, Nd=1.5101) coated with $TiO_3ZrO_2$ 22.1 nm, $Al_2O_3$ 70.6 nm, $TiO_3ZrO_2$ 159.2 nm, $Al_2O_3$ 16.0 nm, $TiO_3ZrO_2$ 73.4 nm and $MgF_2$ 130.5 nm (nm: optical film thickness) by a vacuum evaporation process Internal liquid material: modified silicone oil (Nd=1.4205)

In the case of the numerical example 2, a ghost was 0.09% and no image quality was impaired.

The light transmittance of the entire optical device in a light-wavelength range of 400 nm to 700 nm was approximately 99.5% which was a value free of a substantially practical problem.

(NUMERICAL EXAMPLE 3)

Figure 6:
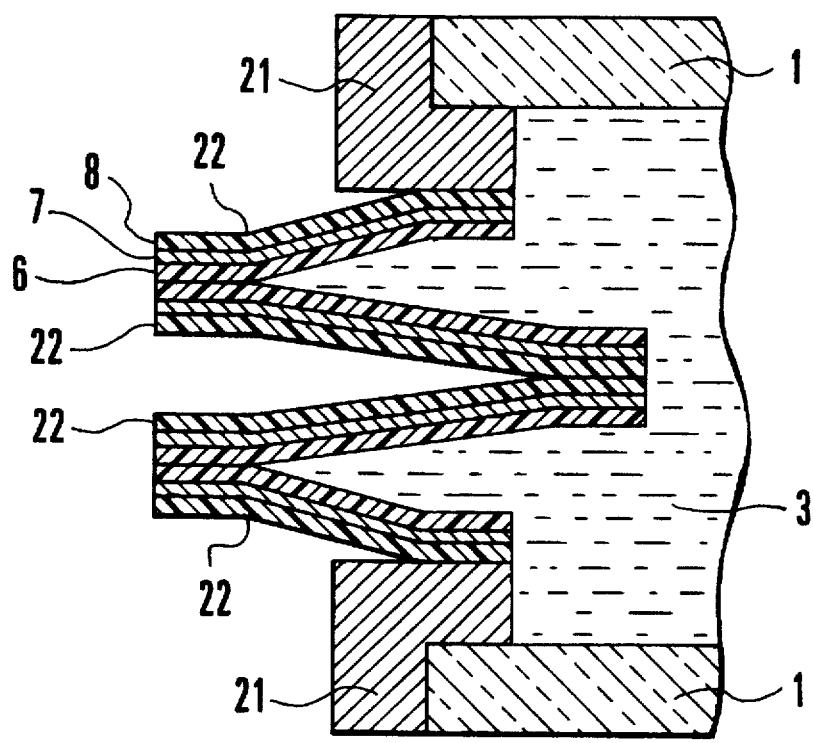
FIG. 6 is a schematic cross-sectional view of a portion of one example of the optical device.

An optical device, which was similar to that shown in FIG. 3 except for the two-step structure of the film members 22 shown in FIG. 6, was prepared and evaluated. The percentage of a ghost and the light transmittance of the entire optical device in the light-wavelength range of 400 nm to 700 nm exhibited good results similar to those obtained in the numerical example 1.

(NUMERICAL EXAMPLE 4)

Figure 7:
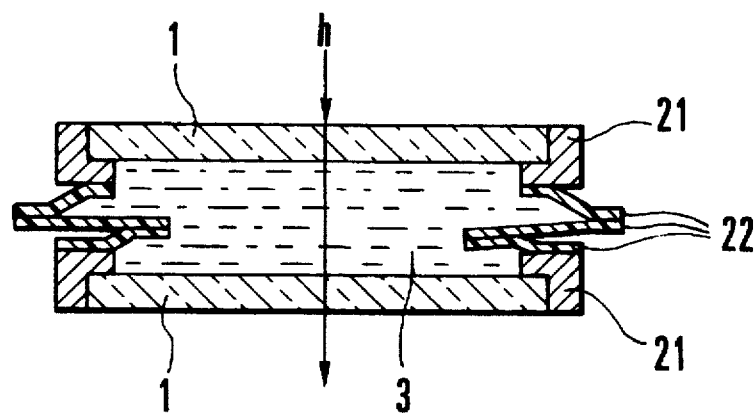
FIG. 7 is a schematic cross-sectional view of a portion of another example of the optical device.

An optical device, which was similar to the numerical example 1 except for the structure of the film members 22 shown in FIG. 7, was prepared and evaluated. The percentage of a ghost and the light transmittance of the entire optical device in the light-wavelength range of 400 nm to 700 nm exhibited good results similar to those obtained in the numerical example 1.

(NUMERICAL EXAMPLE 5)

Figure 8:
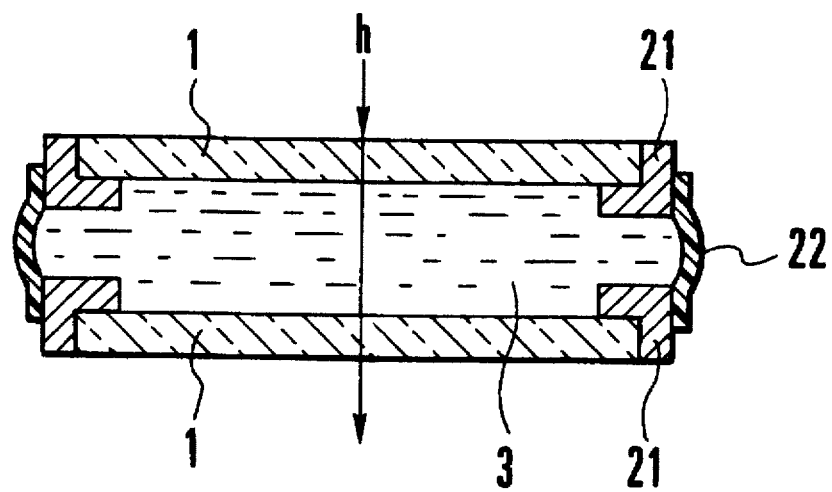
FIG. 8 is a schematic cross-sectional view of a portion of another example of the optical device.

An optical device, which was similar to the numerical example 1 except for the structure of the film members 22 shown in FIG. 8, was prepared and evaluated. The percentage of a ghost and the light transmittance of the entire optical device in the light-wavelength range of 400 nm to 700 nm exhibited good results similar to those obtained in the numerical example 1.

(NUMERICAL EXAMPLE 6)

Figure 9:
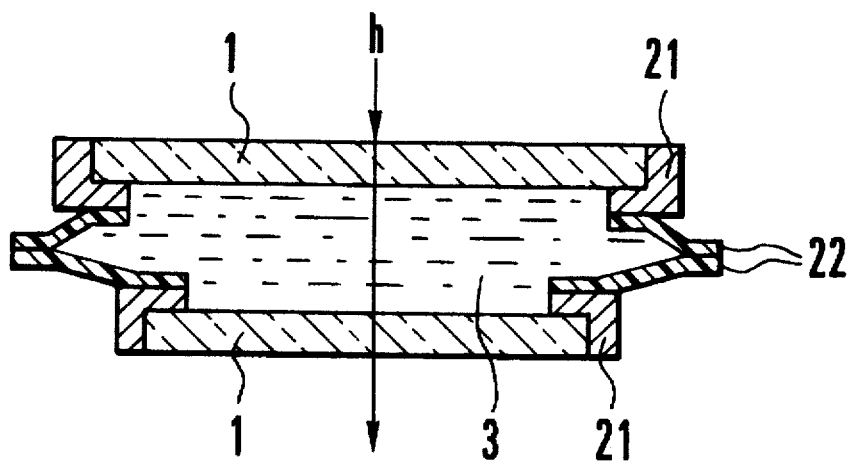
FIG. 9 is a schematic cross-sectional view of a portion of another numerical of the optical device.

An optical device, which was similar to the numerical example 1 except for the structure of the film members 22 shown in FIG. 9, was prepared and evaluated. The percentage of a ghost and the light transmittance of the entire optical device in the light-wavelength range of 400 nm to 700 nm exhibited good results similar to those obtained in the numerical example 1.

Figure 10:
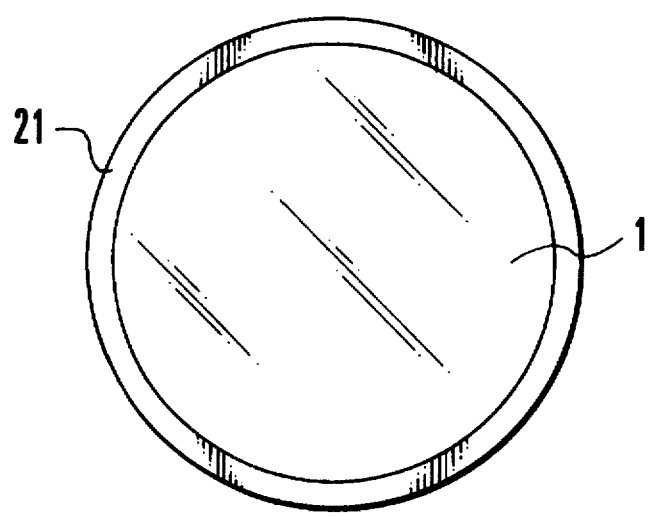
FIG. 10 is a schematic plan view of another example of the optical device.
Figure 11:
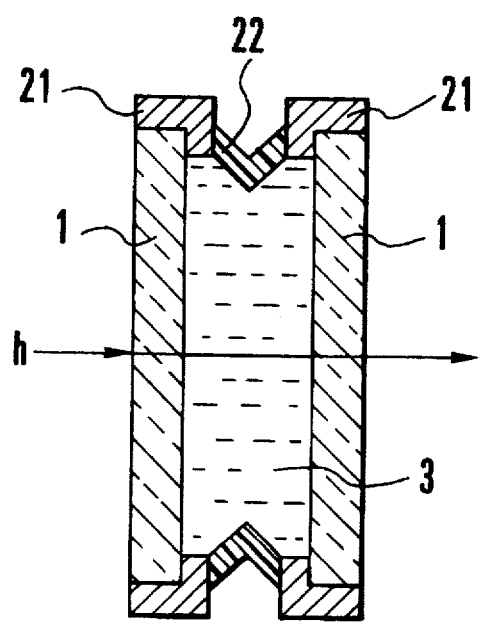
FIG. 11 is a schematic cross-sectional view of the example of FIG. 10.
Figure 12:
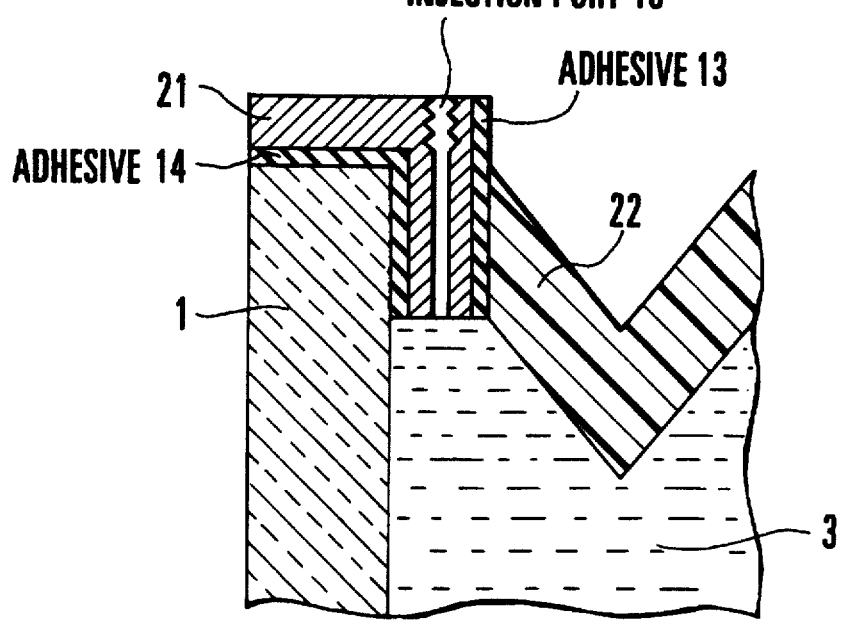
FIG. 12 is a schematic cross-sectional view of a portion of the example of FIG. 10.

Another optical device having the form shown in FIGS. 10 and 11 was prepared. FIG. 12 is an enlarged view showing the vicinity of the connecting member of the optical device. Referring to FIG. 12, an adhesive 13 bonds the film member 22 and the supporting member 21 together, while an adhesive 14 bonds the flat plate 1 and the supporting member 21 together. An injection port 15 for injection of the transparent substance 3 such as a liquid or a gelatinized substance is provided in the supporting member 21, and an internal threaded portion into which a screw lid is fitted is formed on the inlet portion of the injection port 15.

In the shown form, each of the film members 22 has a V-like shape in cross section. However, as the case may be, another cross-sectional shape such as a U-shaped cross section may be employed. In such an arrangement, each of the film members 22 is bent at a small angle so that the deforming driving force for the optical device can be made small.

A material for the film members 22 may be selected from moldable polymeric materials having flexibility, for example, thermoplastic or thermosetting resins such as polyethylene, polypropylene, polyvinyl chloride, polyamide, polystyrene, polyisobutylene, polycarbonate, polyvinylidene chloride, polyvinyl acetal, polymethyl methacrylate, polyacrylonitrile, polyimide, a cellulosic fluororesin, epoxy, a silicone resin, polyurethane and a thermoplastic elastomer, copolymers of them or resins containing a plasticizer or a filler.

Of these materials, comparatively soft materials such as rubber-based materials or thermosetting elastomers are suitable in terms of properties such as adheresiveness, liquid-tightness and stretchability. Thermoplastic or thermosetting resins which are hard but exhibit softness in the form of thin-wall molding are also preferable not only because they have the aforesaid properties, but also because if the molding shape is appropriately determined, the required deforming driving force can be made small.

Of these materials, a silicon rubber, a fluororubber or a butyl rubber is most preferable because their bonding methods are established and because they have good adhesiveness, high liquid resistance, strong expansion/shrinkage durability and the ability to minimize the deforming driving force.

The optical transparent substance 3 may be selected from, for example, the group consisting of alcohols such as ethyl alcohol and ethylene glycol, alkyl halides such as carbon tetrachloride, chloroform and ethylene bromide, organic acids such as formic acid and acetic acid, esters such as methyl acetate and ethyl acetate, organic liquids such as ether, ketone, low-molecular weight polyether and low-molecular weight polyester aromatic compounds, solutions in which a solid is molten in any of the above liquids, a liquid mixture of any of the above liquids, transparent viscous liquids such as liquid paraffin and silicone oils, and so on. Of these, the silicone oils are optimum, particularly a modified silicone oil such as a dimethyl silicone oil, a methylphenyl silicone oil, a diphenyl silicone oil or a fluorosilicone oil is preferable because they do not solidify or vaporize in the temperature range in which the optical device is used and also because they are insusceptible to refractive-index variations due to temperature variations. It is also preferable to use hydrophilized silicone oils which have been subjected to hydrophilization so as to assume hydrophilicity for the purpose of preventing water, which penetrates the optical device at an extremely small rate with the elapse of time, from forming particles to scatter light. It is also preferable to use a fluorocompound exhibiting an increased Abbe number and a reduced dispersion in terms of optical characteristics, for example, perfluoropolyether.

It is desirable to select appropriate materials for the film member 22 and the transparent substance 3 so that the film member 22 and the transparent substance 3 can be combined so as to prevent the film member 22 from melting or swelling in the transparent substance 3. For example, it is preferable to combine a fluorosilicone oil with a silicone rubber, a dimethyl silicone oil with a fluororubber, and so on.

The supporting member 21 is preferably made of a material which can be easily bonded to the film member 22. To facilitate incorporation of the optical device into an optical apparatus such as a camera, the supporting member 21 is preferably provided with a positioning reference surface available for such incorporation, fixing threaded holes and the like.

If the flat plates 1 are made from a glass material, the supporting members 21 are each preferably formed in an L-like shape in cross section as shown in FIG. 11 since the glass plates can be reliably held.

As a material for the supporting member 21, aluminum is preferable since it can be easily and strongly bonded to the film member 22 and has a light weight.

An example of a method of manufacturing the optical device arranged in the above-described form will be described below.

First of all, the two supporting members 21 formed by precise cutting are prepared. The film member 22 of V-like cross-sectional shape, manufactured by casting or transfer molding of a silicone rubber, is bonded to the supporting members 21 with the adhesive 13 as shown in FIG. 12. In this case, as the adhesive 13, it is preferable to use an adhesive, such as a silicone-based adhesive, which is made of a material similar to that of the film member 22. It is preferable that the bonding surface of each of the supporting members 21 be subjected to primer coating, as required, since a far higher bonding strength can be obtained.

Figure 13:
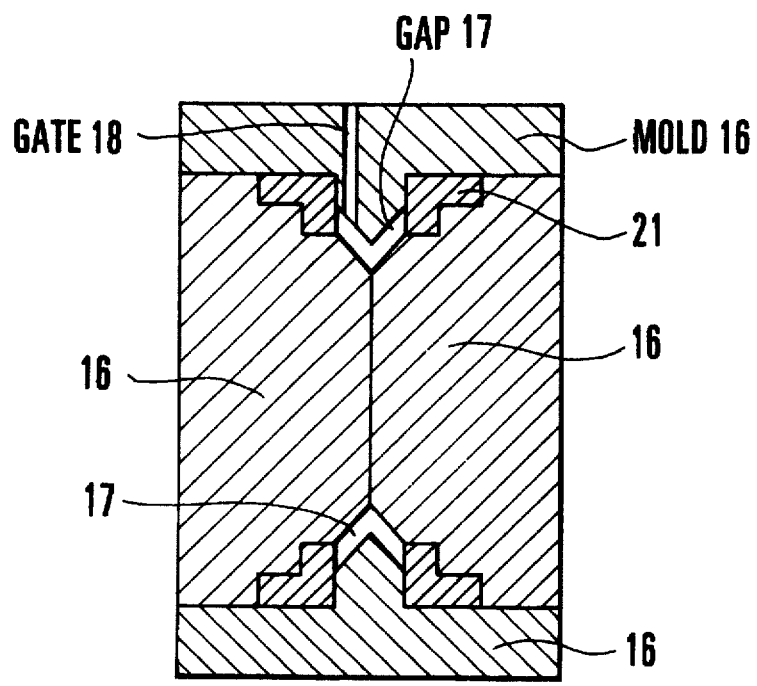
FIG. 13 is a schematic cross-sectional view of the essential portions of an optical-device manufacturing apparatus.

As shown in FIG. 13, it is also possible to simultaneously carry out forming of the film member 22 and bonding of the supporting members 21 to the film member 22 by holding the supporting members 21 by means of a plurality of mold pieces 16 and feeding a rubber material, which is a liquefied or high-temperature plasticized, polymeric material to be molded, through a gate 18 into a gap 17 defined by the mold pieces 16. In this case as well, it is desirable to beforehand apply and bake a primer coating agent, such as a metal catalyst-containing silane coupling agent, at a position corresponding to the location of the adhesive 13.

(NUMERICAL EXAMPLE 7)

An optical device, which was similar to the numerical example 1 except for the structure shown in FIGS. 10 and 11, was prepared and evaluated. The percentage of a ghost and the light transmittance of the entire optical device in the light-wavelength range of 400 nm to 700 nm exhibited good results similar to those obtained in the numerical example 1.

Then, each of the flat plates 14 is precisely fitted into a respective one of the supporting members 21 with a small clearance from the bonding surface thereof, so that the flat plates 14 are respectively bonded to the supporting members 21 by the adhesives 14. Finally, after the transparent substance 3 is injected through the injection port 15 provided in the supporting member 21, the injection portion 15 is closed by a screw lid.

Figure 14:
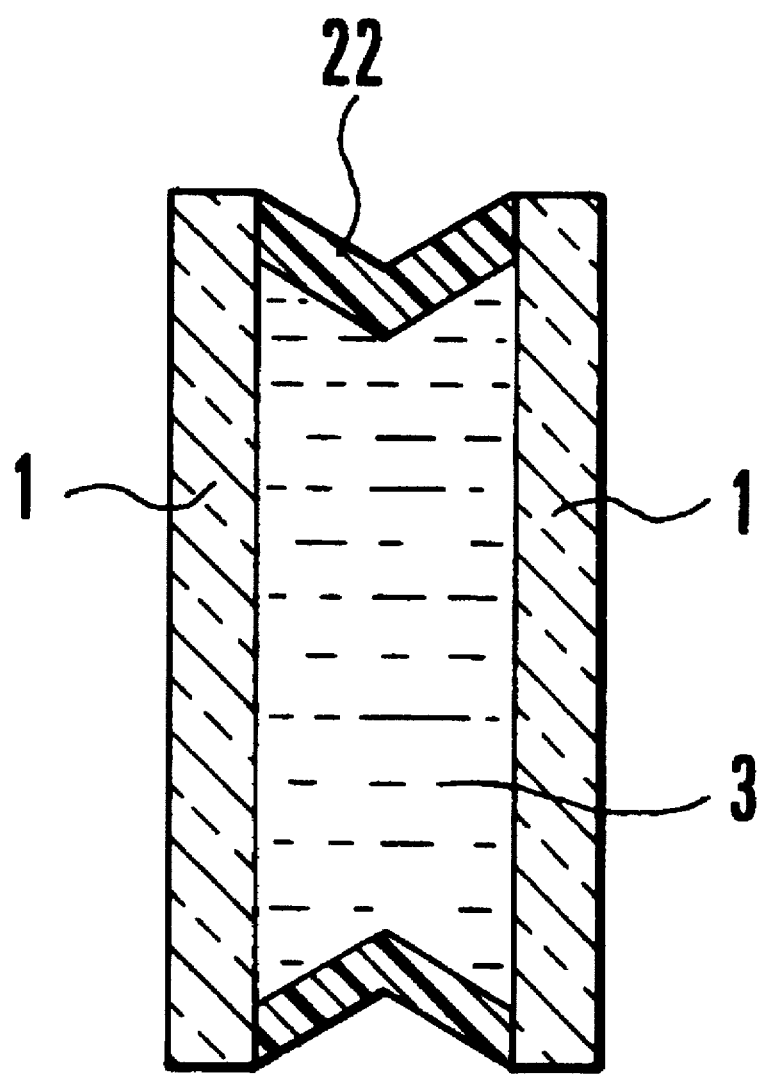
FIG. 14 is a schematic cross-sectional view of another example of the optical device.

The optical device shown in FIG. 14 has an arrangement in which the flat plates 1 and the film member 22 are directly bonded to each other. If an arrangement capable of facilitating bonding of the flat plates 1 and the film member 22 is adopted, the supporting members may be omitted. Such an arrangement is preferable in that it is possible to reduce the number of assembly steps and the complexity of the optical device.

Modifications of the example in which the flat plates 1 and the film member 22 are directly bonded to each other will be described below.

Figure 15:
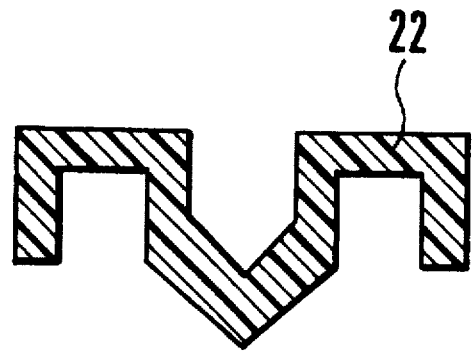
FIG. 15 is a schematic cross-sectional view of one constituent element of the optical device.
Figure 16:
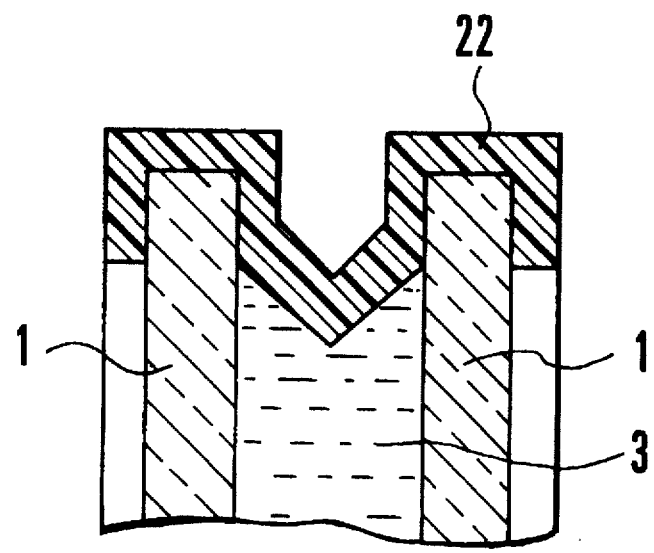
FIG. 16 is a schematic cross-sectional view of a portion of an optical device using the constituent element of FIG. 15.

Since the film member 22 is made of a moldable material, it is possible to beforehand mold the film member 22 in the shape shown in, for example, FIG. 15. By performing this molding, it is possible to bond the flat plates 1 to the film member 22 with the flat plates 1 being fitted into the film member 22 as shown in FIG. 16. Even if the adhesiveness is insufficient, the flat plates 1 and the film member 22 can be reliably bonded together.

Figure 17:
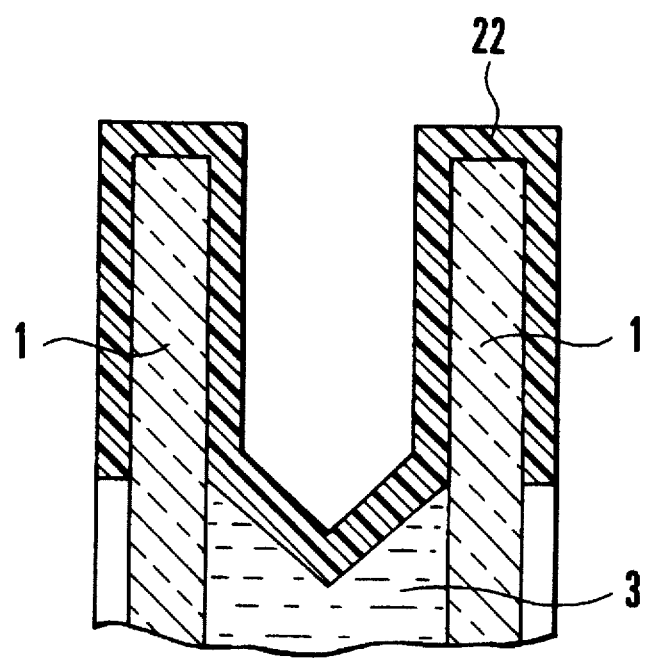
FIG. 17 is a schematic cross-sectional view of a portion of an optical device using another constituent element.

If the film member 22 is shaped in such a manner that the film member 22 can be deeply fitted onto the plate plates 1 as shown in FIG. 17, the required bonding area can be made wide to improve the durability of the bonding to a further extent.

Figure 18:
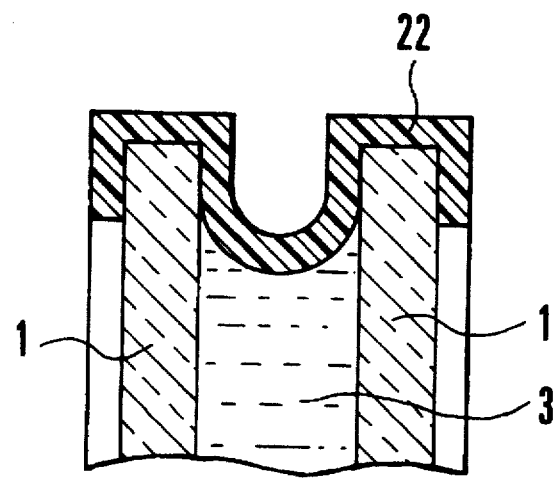
FIG. 18 is a schematic cross-sectional view of a portion of an optical device using another constituent element.

During an expanding/shrinking driving operation, forces are generally concentrated into the bend of the film member 22 which has a V-like shape in cross section. For this reason, if a long-time driving operation or a repetitive driving operation is performed, the bend may be degraded and broken. Accordingly, if the optical device is to be combined with an arrangement capable of producing an increased driving force, particularly if a selected material is not suited for such a V-like bend, the film member 22 having a U-like shape in cross section as shown in FIG. 18 is used to prevent a driving force produced during the expanding/shrinking driving operation from concentrating at a single location of the film member 22, whereby the durability of the film member 22 can be improved extremely effectively.

Figure 19:
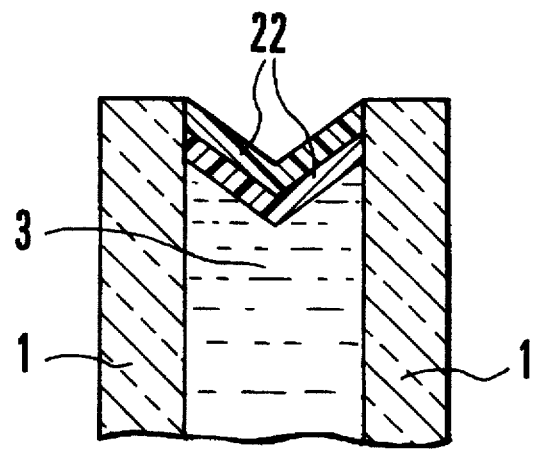
FIG. 19 is a schematic cross-sectional view of a portion of an optical device using another constituent element.

If the film member 22 tends to easily swell in the transparent substance (liquid) 3 or the transparent substance 3 tends to exude through the film member 22, it is preferable to form the film member 22 as a two-layer structure as shown in FIG. 19.

Figure 20:
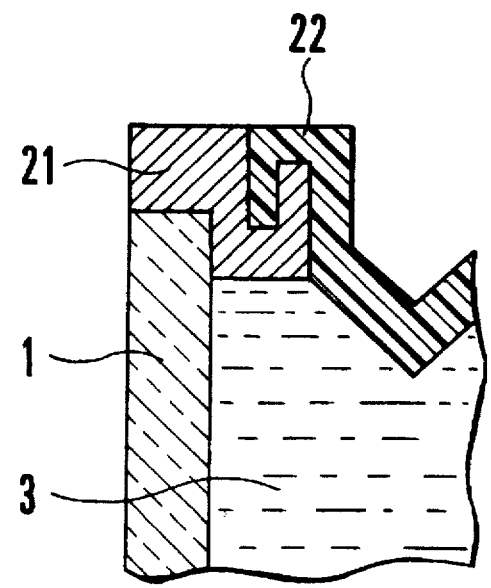
FIG. 20 is a schematic cross-sectional view of a portion of an optical device using another constituent element.
Figure 21:
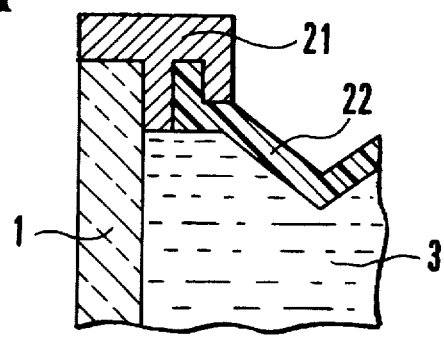
FIG. 21 is a schematic cross-sectional view of a portion of an optical device using another constituent element.

If the supporting member 21 is formed into a shape engageable with the film member 22 as shown in FIGS. 20 and 21, the durability of bonding can be improved far more effectively.

Figure 22:
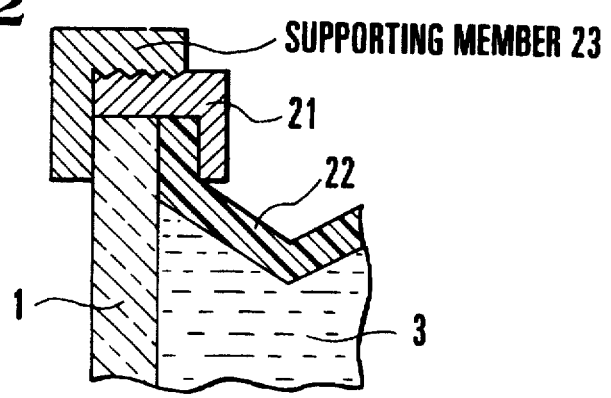
FIG. 22 is a schematic cross-sectional view of a portion of an optical device using another constituent element.

As shown in FIG. 22, if another supporting member 23 is prepared in addition to the supporting member 21, the flat plate 1 and the film member 22 can be far more firmly bonded together by the process of bonding the film member 22 to the supporting member 21 with the film member 22 being engaged with the supporting member 21 and mounting the supporting member 23 to the supporting member 21 by fastening the supporting member 23 by means of threaded portions formed on the respective supporting member 21 and 23.

Figure 23:
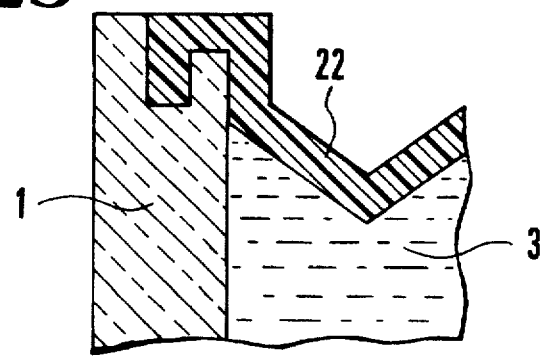
FIG. 23 is a schematic cross-sectional view of a portion of an optical device using another constituent element.
Figure 24:
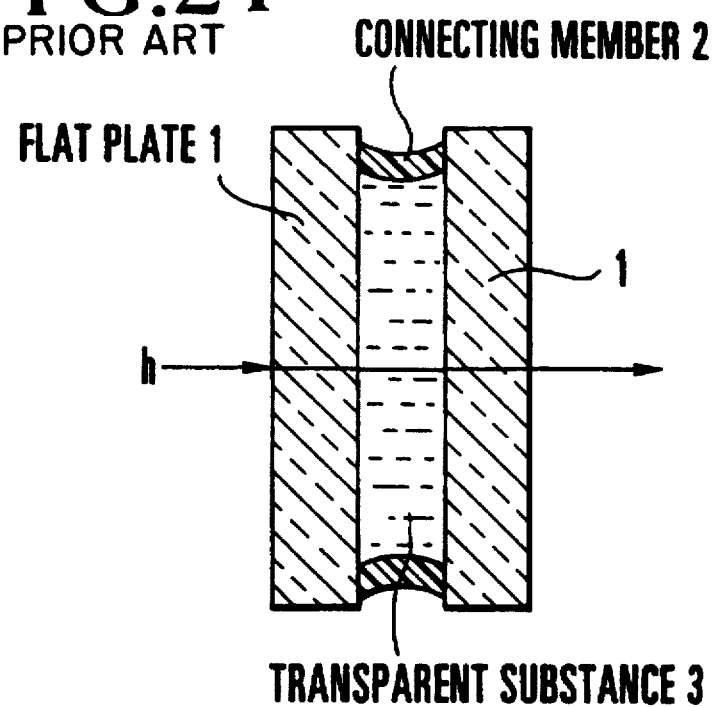
FIG. 24 is a schematic cross-sectional view of a conventional optical device.
Figure 25:
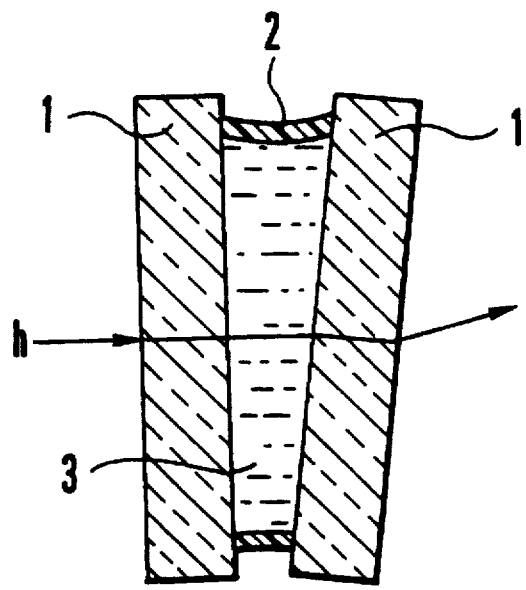
FIG. 25 is a schematic cross-sectional view of the conventional optical device.

It is also preferable that an engagement portion for the film member 22 be formed on the flat plate 1 as shown in FIG. 23, because it is possible to omit the supporting member and to easily obtain a higher bonding strength by directly bonding the film member 22 to the engagement portion.

In the case of the optical devices shown in FIGS. 14 to 23, bonding may be performed by using an adhesive or primer coating, or a method of simultaneously performing forming and bonding of the film member may be adopted.

(NUMERICAL EXAMPLE 8)

An optical device, which was similar to the numerical example 1 except for the structure shown in FIG. 14, was prepared and evaluated. The percentage of a ghost and the light transmittance of the entire optical device in the light-wavelength range of 400 nm to 700 nm exhibited good results similar to those obtained in the numerical example 1.

(NUMERICAL EXAMPLE 9)

An optical device, which was similar to the numerical example 1 except for the structure described below, was prepared and evaluated. The percentage of a ghost and the light transmittance of the entire optical device in the light-wavelength range of 400 nm to 700 nm exhibited good results similar to those obtained in the numerical example 1.

Flat plate: acrylic plate (diameter: 43 mm, thickness: 1.2 mm, refractive index: Nd=1.492) coated with $MgF_2$ 195 nm (nm: optical film thickness) by dip coating A ghost was approximately 0.06% and no image quality was impaired. It was also discovered that the light transmittance of the entire optical device at 780 nm was approximately 98.0% which was a value free of a substantially practical problem.

(NUMERICAL EXAMPLE 10)

An optical device, which was similar to the numerical example 1 except that the substance described below was used as a liquid for the transparent substance 3, was prepared and evaluated. The percentage of a ghost and the light transmittance of the entire optical device exhibited good results similar to those obtained in the numerical example 1.
Internal liquid material: modified silicone oil (refractive index: Nd=1.4100)

A ghost was approximately 0.06% and no image quality was impaired. It was also discovered that the light transmittance of the entire optical device in the light-wavelength range of 400 nm to 700 nm was approximately 99.5% which was a value free of a substantially practical problem.

Comparative examples which do not conform to the conditions according to the present invention will be described below in comparison with the above-described numerical examples.

(COMPARATIVE EXAMPLE 1)

An optical device, which was similar to the numerical example 1 except for the conditions described below, was prepared and evaluated.
Flat plate: NbFD3 optical glass flat plate (diameter: 43 mm, thickness: 1.2 mm, Nd=1.8045) coated with $TiO_3ZrO_2$ 40.0 nm/$Al_2O_3$ 32.0 nm/$TiO_3ZrO_2$ 168.0 nm/$Al_2O_3$ 26.0 nm/$TiO_3ZrO_2$ 66.0 nm/$MgF_2$ 136.0 nm (nm: optical film thickness) by a vacuum evaporation process
Internal liquid material: modified silicone oil (Nd=1.4205)

In the case of the comparative example 1, a ghost was approximately 1.4% and image quality was impaired. The light transmittance of the entire optical device in the light-wavelength range of 400 nm to 700 nm was approximately 96.8%.

(COMPARATIVE EXAMPLE 2)

An optical device, which was similar to the numerical example 1 except for the conditions described below, was prepared and evaluated.
Flat plate: LaF2 optical glass (diameter: 43 mm, thickness: 1.2 mm, Nd=1.7440) with no anti-reflection film
Internal liquid material: modified silicone oil (Nd=1.4205)

In the case of the comparative example 2, a ghost was approximately 1.0% and image quality was impaired. The light transmittance of the entire optical device in the light-wavelength range of 400 nm to 700 nm was approximately 90.0% which was a practically insufficient level.

(COMPARATIVE EXAMPLE 3)

An optical device, which was similar to the numerical example 1 except for the conditions described below, was prepared and evaluated.
Flat plate: blue flat glass (diameter: 43 mm, thickness: 1.2 mm, Nd=1.52) with no anti-reflection film
Internal liquid material: modified silicone oil (Nd=1.4205)

In the case of the comparative example 3, a ghost was approximately 0.11% and no image quality was impaired. However, the light transmittance of the entire optical device in the light-wavelength range of 400 nm to 700 nm was approximately 92.5% which was a practically insufficient level.

As is apparent from the foregoing description, in accordance with the present invention, by using optical elements, such as any of the above-described flat plates, and a transparent substance, such as any of the above-described ones, which satisfy the above-described or similar conditions, it is possible to provide an optical device which is capable of operating stably at all times without causing a ghost which may adversely affect image quality in an employed range of wavelengths and without decreasing light transmittance relative to a transmitted light flux. Particularly, it is possible to provide an optical device which can be used as an excellent variable angle prism for an image stabilizing optical system.

While the present invention has been described with respect to what is presently considered to be the preferred embodiments, it is to be understood that the invention is not limited to the disclosed embodiments or numerical examples. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. An optical device comprising: two optical elements; a deformable connecting member for connecting said two optical elements to constitute a hermetic space; and a transparent substance enclosed in the hermetic space, said optical device being arranged to be capable of varying an angle formed by said two optical elements, wherein a refractive index Ng of said optical elements and a refractive index Nt of said transparent substance are selected to satisfy the following inequality:

$$\left[ \frac{Ng - Nt}{Ng + Nt} \right]^2 < 0.005$$

and wherein a single or multiple anti-reflection layer is provided on a surface of said optical elements.

2. An optical device comprising:
   two optical elements;
   a deformable connecting member for connecting said two optical elements to constitute a hermetic space; and
   a transparent substance enclosed in the hermetic space, said optical device being arranged to be capable of varying an angle formed by said two optical elements, wherein said deformable connecting member comprises a film member of not greater than 200 μm in thickness, wherein said transparent substance is a silicone oil provided with hydrophilicity for preventing water which penetrates said optical device from causing undesired scattering.

3. An optical device comprising: two optical elements; a deformable connecting member for connecting said two optical elements to constitute a hermetic space; and a transparent substance enclosed in the hermetic space, said optical device being arranged to be capable of varying an angle formed by said two optical elements, wherein said transparent substance is a fluoro-oil.

* * * * *

UNITED STATES PATENT AND TRADEMARK OFFICE
CERTIFICATE OF CORRECTION

PATENT NO. : 5,541,776
DATED      : July 30, 1996
INVENTOR(S): Kobayashi et al.

It is certified that error appears in the above-indentified patent and that said Letters Patent is hereby corrected as shown below:

On the title page, item

[56] References Cited:

FOREIGN PATENT DOCUMENTS

"4111906  6/1966  Japan" should read --41-11906 6/1966 Japan--.

COLUMN 4:

Line 9, "numerical" should read --example--.

COLUMN 7:

Line 13, "to noted" should read --to be noted--; and
Line 26, "8" should read --8.--.

COLUMN 10:

Line 17, "adheresiveness," should read --adhesiveness,--.

Signed and Sealed this

Tenth Day of December, 1996

Attest:

BRUCE LEHMAN

Attesting Officer    Commissioner of Patents and Trademarks